United States Patent [19]
LaVanchy et al.

[11] Patent Number: 5,304,018
[45] Date of Patent: Apr. 19, 1994

[54] PLUNGE CUTTING DEVICE AND METHOD FOR PLASTIC PIPE MEMBERS SUCH AS PIPE COUPLINGS, FLANGES, HUBS, AND THE LIKE

[76] Inventors: Wayne N. LaVanchy, 5116 Peyton Place Ct., St. Louis, Mo. 63128; Darrell G. Stack, 3111C Broken Oak Dr., St. Louis, Mo. 63129

[21] Appl. No.: 854,586

[22] Filed: Mar. 20, 1992

[51] Int. Cl.$^5$ .................................. B23B 5/16
[52] U.S. Cl. ........................ 408/1 R; 82/113; 408/196; 408/201; 408/204; 408/713
[58] Field of Search ............... 82/113; 408/82, 113, 408/114, 196, 197, 201, 203.5, 204, 225, 200, 206, 207, 1 R, 1 B, 713

[56] References Cited

U.S. PATENT DOCUMENTS

| | | |
|---|---|---|
| 2,359,474 | 10/1944 | Gairing . |
| 2,470,392 | 5/1949 | Gassmann . |
| 2,797,420 | 7/1957 | Lundquist . |
| 2,868,085 | 1/1959 | Klein . |
| 3,075,219 | 1/1963 | Ott . |
| 3,532,010 | 9/1968 | Klintworth . |
| 3,636,803 | 1/1972 | Miller .................................. 144/205 |
| 3,817,649 | 6/1974 | Medney ............................... 408/211 |
| 3,976,388 | 8/1976 | Webb .................................. 408/211 |
| 3,999,452 | 12/1976 | Larsen ................................ 144/205 |
| 4,114,484 | 9/1978 | Feamster, III ...................... 144/205 |
| 4,364,290 | 12/1982 | Astle ................................ 82/113 X |
| 4,586,408 | 5/1986 | Goldner .............................. 144/205 |
| 4,691,600 | 9/1987 | Carlson et al. ....................... 144/205 |
| 4,693,643 | 9/1987 | Heyworth ............................. 408/82 |
| 4,930,948 | 6/1990 | Bowen ............................... 408/190 |

*Primary Examiner*—Steven C. Bishop
*Attorney, Agent, or Firm*—Leydig, Voit & Mayer

[57] ABSTRACT

A universal plunge cutter for plastic pipe, pipe couplings, plastic flanges and other planar members, is provided. The plunge cutter has a cylindrical body supporting cutters, a drive shaft, a pilot mandrel for guiding the cylindrical body. The cutters are adjustably mounted in cutter slots formed in the cylindrical body so that the cutters present forwardly facing cutting edges which lie skewed relative to a radius of the cylindrical body. A method for the use of the plunge cutter is also provided.

28 Claims, 2 Drawing Sheets

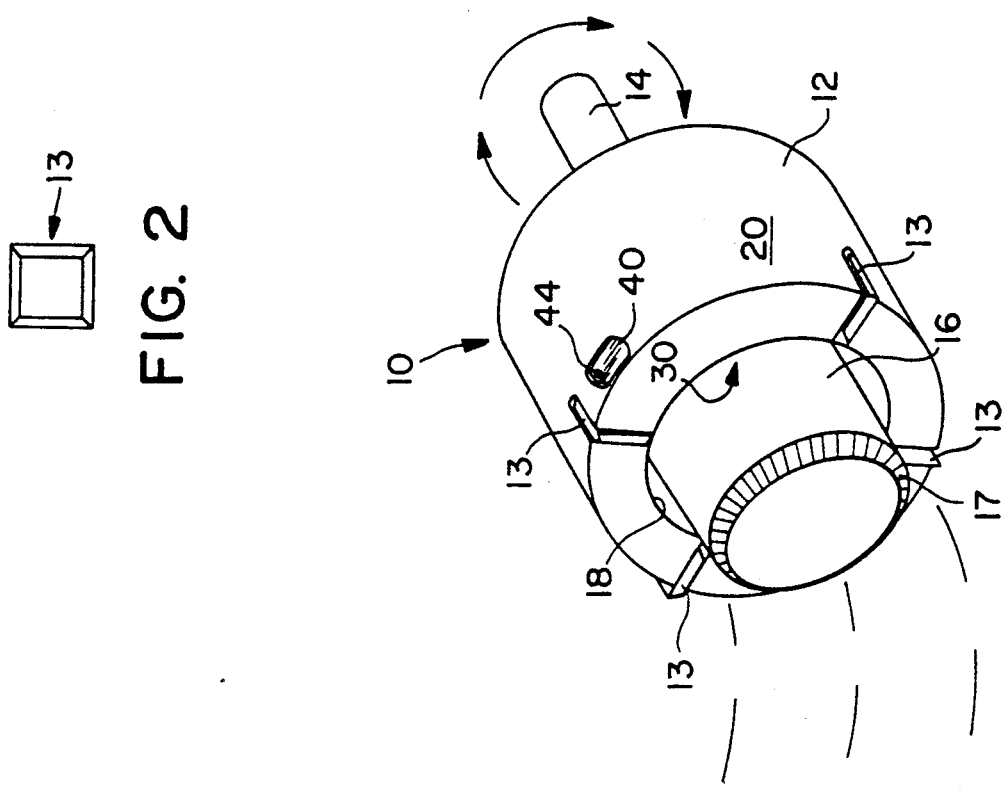
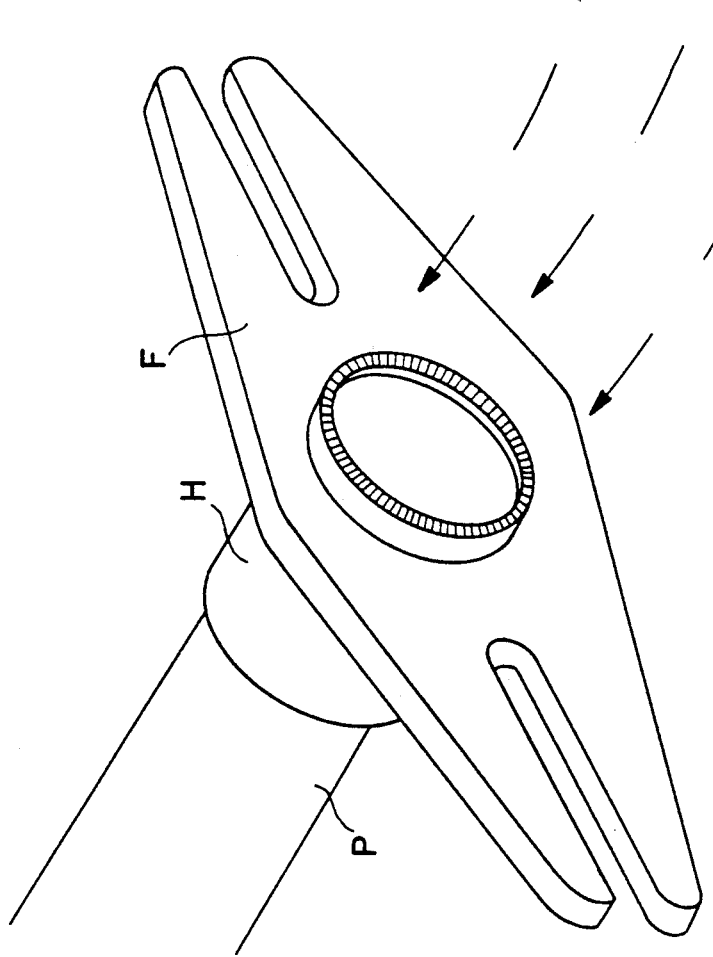

PLUNGE CUTTING DEVICE AND METHOD FOR PLASTIC PIPE MEMBERS SUCH AS PIPE COUPLINGS, FLANGES, HUBS, AND THE LIKE

TECHNICAL FIELD

This invention relates to a novel plunge cutter for plastic pipe members and a method for removing unwanted material from plastic pipe such as in the removal and replacement of plastic pipe couplings. More particularly, the invention relates to a cylindrical cutter carrying body adapted to be rotably driven and a novel method for plunge cutting a plastic pipe member.

BACKGROUND OF THE INVENTION

Plastic pipe cutters as used for shaving, milling and cutting the ends of plastic pipe are well known. Also cutters for removing the hub of a pipe coupling have been described in the literature. Such devices are useful in repair and replacement where plastic pipe must be conditioned to receive a new fitting. Such devices are most useful in situations where access to the pipe is limited, e.g., the pipe is embedded in and projects from a wall in such a way that replacement or extension of the pipe is not readily accomplished. Some examples of such devices are now provided.

U.S. Pat. No. 4,691,600 to Carlson discloses a pipe shaving tool with recessed disk cutters mounted on forwardly projecting lugs positioned about an elongated mandrel. The Carlson device is mountable to a power drill or the like, and used exclusively for shaving the outer surface of a pipe to both a predetermined depth and length. The Carlson device has limited application, first because the cutters are recessed and secondly because the cutter position is not adjustable. Therefore, if the pipe or hub is too large to fit between the radiused gap defined by the lugs and the mandrel, the cutters can not access the hub. Furthermore, the Carlson device is not able to shave or cut a planar flange member or mounting fixture which is attached to the pipe. It is first necessary to cut the mounting fixture off the pipe end, for example, with a saw. Accordingly, the Carlson tool has limited applicability.

Another example of a pipe planing device but one of limited usefulness, is found in U.S. Pat. No. 4,693,643 to Heyworth. Heyworth describes a device for progressive planing of the interior of a plastic pipe which features a cylindrical pilot member, a shaft, and a rotatable hub. The rotatable hub includes circumferentially spaced and radially projecting spider arms on the end of which square cutters are recessed and fixedly secured. The cutters are fixed at a negative rake angle and their outer edges extend radially outward beyond the hub. The outer cutter edges are positioned on a radius to be flush with the inner diameter of a pipe. As in the case of other prior art reaming devices, Heyworth requires that the pipe be cut transversely before planing.

Bowen, in U.S. Pat. No. 4,930,948, describes a specialized tool for valve seat refitting, the purpose being to simultaneously cut the three faces of a valve seat. To achieve this purpose, Bowen uses a rotary driven, cylindrical body portion with longitudinal, tangential slots to support adjustably mounted, variably positioned, cutting blades. The blades project forwardly of the body in different orientations and at different lengths to cut all three faces of the valve seat for refitting.

The known devices possess general utility to remove hubs, sawed off pipe joints and the like, or specialized utility, e.g., to refit a valve seat. However, the known devices do not address or solve the problem associated with removal of mounted flanged pipe couplings or removal of fixtures having a diameter substantially greater than the diameter of the pipe. The prior art discloses pipe shaving devices for general use which require the cutters either to travel in a circular path moving inwardly from the outer diameter to the inner diameter of the pipe or to abut a pilot during the cutting/reaming operation to maintain the cutters in a proper position.

Furthermore, during cutting operations with the prior art devices, the plastic shavings can accumulate in front of the device or cutter edges which can result in non-uniform cutting. Some devices, such as those identified above, incorporate the cutters on projecting arms or spiders so that during the cutting operation the pipe shavings do not compress in front of the cutters but move into the gaps between the arms and, if used in an open area, may fall away from the device by gravity. This method of temporarily removing the shavings from the cutter edges can lead to guidance and alignment problems when the shavings are allowed to accumulate and compact in front of the tool during use.

SUMMARY OF THE INVENTION

It is therefore an object of the invention to overcome the problems experienced with the prior art.

Still another object of this invention is to provide a simple plunge cutting device and method.

Still another object of this invention is to provide a universal plunge cutting device and method for removal of pipe couplings, hubs from pipe joints, and flanged or planar members attached to plastic piping.

These and other objects are satisfied by a plunge cutter device for cutting plastic pipe members, such as a coupling, hub and/or flange, carried by a pipe end portion, comprising:

- a cylindrical body having an annular section having a front face, the annular section being of selected length and thickness, the annular section defining an inner annular surface and an outer annular surface, the cylindrical body having at least one slot extending axially from the front face to a selected depth, each slot being defined by a leading wall and a trailing wall, the trailing wall lying in a radius of the cylindrical body;
- a cutter for the at least one slot;
- positioning means for securing each cutter in a respective slot, the positioning means permitting the cutter to be positioned to project forwardly from the front face of the annular section;
- pilot means for guiding the cylindrical body relative to a pipe end portion, the pilot means being dimensioned to journal within the pipe end portion and being disposed co-axially of the annular section and secured to the cylindrical body; and
- drive coupling means for coupling the cylindrical body to a source of rotational energy to cause the cylindrical body to rotate about its axis relative to the exposed pipe portion.

Other objects of this invention are satisfied by a method for plunge cutting a pipe member with a tool including a cylindrical body having an annular section with a front face having a plurality of slots, a pilot, and at least one cutter dimensioned to be secured within each of the plurality of slots. The method comprises the steps of: positioning a first selected number of the cutters in the slots so that the first selected number of cutters project radially inward a selected distance from the annular section; positioning a second selected number of the cutters in the slots so that the second selected number of cutters project radially outward a selected distance from the annular section; positioning a third selected number of the cutters in the slots so that the third selected number of cutters project a selected distance forward of a front face of the annular section; inserting the pilot into the pipe member to guide the cylindrical body; rotating the cylindrical body; moving the cylindrical body axially to bring the cutters into contact with an exposed portion of the pipe member while continuing to rotate the cylindrical body thereby to cause the cutters to cut the pipe member; and maintaining the cutters in cutting contact with the pipe member until the pipe member is cut to a desired axial extent.

This invention provides a simple, expedient and inexpensive means to assist in one of the more troublesome activities confronted by a plumber. That is, the controlled removal of a flush mounted pipe coupling structure without the need for sawing, chiseling, grinding, sanding, filing, and the like which is normally required to be done manually.

The invention should become clear to the person having ordinary skill in the art upon review of the drawings and the following detailed description thereof.

BRIEF DESCRIPTION OF THE DRAWINGS

FIG. 1 is a perspective view illustrating a four-cutter embodiment of a plunge cutter device positioned near a pipe end carrying a hub and a wall-mounting flange.

FIG. 2 is a rear view of a cutter.

DETAILED DESCRIPTION OF THE BEST MODE

The Plunge Cutter

Figure 3:
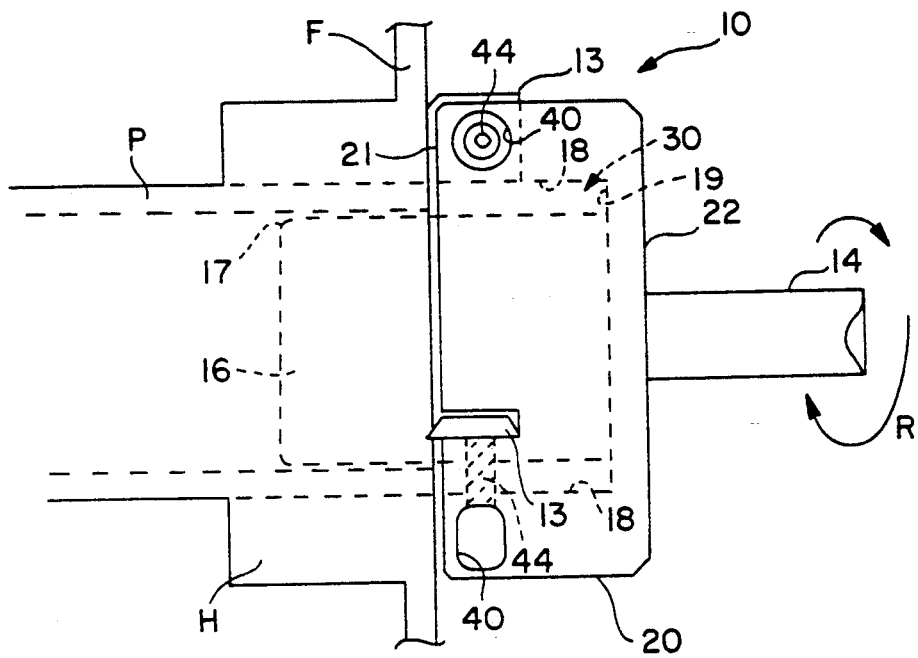
FIG. 3 is a side view with ghost lines of a plunge cutter of a type as illustrated in FIG. 1.

FIGS. 1–4 illustrate different plunge cutter embodiments of the invention. The three largest constituents of the plunge cutter devices 10 illustrated are the cylindrical body 12 which supports the cutters 13, the drive coupling shaft 14 and the pilot 16.

The pilot 16 serves as a mandrel for guiding the plunge cutter 10 during cutting operations. The pilot 16, preferably, is made from aluminum or steel, preferably aluminum such as 6061 aluminum or an aircraft grade aluminum, and includes a cylindrical mass incorporating a slightly beveled front edge 17 to facilitate insertion into a pipe member. The pilot 16 is preferably solid and has a plurality of radially disposed, equidistantly spaced, threaded screw holes (not illustrated) axially recessed in the back face of the pilot 16.

The drive shaft 14 is adapted for connection to a power drill, manually rotated drill, or the like to rotate the plunge cutter 10 about its axis. The shaft 14, preferably composed of hardened steel, is forged or machined to be press fit or shrink fit, for example, into the cylindrical body 12 coaxially of the pilot 16 and extends from the outer back wall 22 thereof. The exposed portion of the shaft 14, preferably, possesses a polygonal cross-section to facilitate secure attachment to the source of rotational force, e.g. a drill.

The cylindrical body 12 has an annular section defining an inner annular surface 18, an inner back surface 19, an outer annular surface 20, and a front face 21. The inner back surface 19 includes three screw holes 24, equidistantly and centrally disposed about the center of the cylindrical body 12, and a shaft hole 26 formed at the center. The shaft hole 26 is dimensioned to accommodate the diameter or thickness of the shaft 14. The pilot 16 is mounted on the cylindrical body 12 with the screws 28. Screws 28 are secured in the holes 24 aligned with holes (not shown) in the back face of the pilot 16 to position the pilot 16 coaxially with the cylindrical body 12. When the pilot 16 and the cylindrical body 12 are secured to one another, they establish an annulus 30 which has a width selected to be slightly larger than the thickness of the pipe which is to be cut. The depth of the annulus 30 is of sufficient length to permit complete plunge cutting of the pipe and any member coupled thereto. If the pipe wall is of greater thickness than the norm, it is a simple matter to change the width of the annulus by substituting a pilot 16 of different dimensions. If the pipe wall is of a lesser thickness than the norm, a sleeve (not shown) of rolled shim stock or the like can be provided by forming the shim stock around the pilot 16 or by inserting it and fitting it around the open end of the pipe thereby allowing the pilot 16 to fit snugly within the pipe and preventing wobbling while the plunge cutter 10 is rotated. Indeed, if the pipe member is not cylindrical, e.g. square, and the pilot 16 is attached to the supporting body 12 in a manner where it can rotate independently thereof, the pilot 16 can possess a cross-sectional configuration corresponding to the pipe. This modified arrangement will permit plunge cutting of a coupling of a polygonal pipe, albeit with the result of a rounded outer surface.

Figures 4, 5:
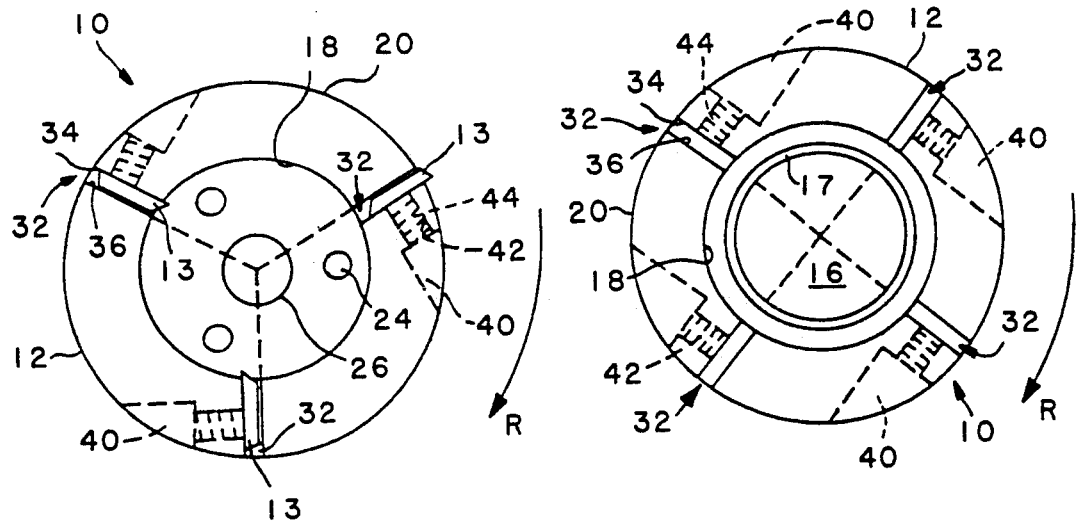
FIG. 4 is a partial cutaway front view of the cylindrical body of the type shown in FIG. 1 illustrating an embodiment with three cutter slots, and the counterbores, set screw holes, and slots.
FIG. 5 is a front view of the cylindrical body of an embodiment of a plunge cutter device with four cutter slots as shown in FIG. 1.

In accordance with an important aspect of this invention, the cylindrical body 12 has means for supporting cutters at particular locations on the supporting body 12, herein shown as slots 32 disposed equidistantly about its front annular face 21. In FIG. 4, the cylindrical body is illustrated with three such slots spaced 120° apart while FIGS. 1 and 5 illustrates a cylindrical body with four slots spaced 90° apart. While, in principle, the invention could employ only one slot, a plurality, equally spaced around the annular section, is preferred. The cylindrical body 12 with forwardly extending annular section provides a strong, rigid, balanced support for the cutters 13 carried thereby, so as to permit cutting of an exposed portion of a plastic pipe member with a minimum of vibration and chattering.

It is preferred to provide slots 32 of constant width and depth, each defined (see FIGS. 4 and 5) by a leading wall 34 and a trailing wall 36 to support cutters 13 of a preferred square shape, which thereby present cutting edges extending ahead of the front face 21 of the body 12. In order to allow plunge cutting of a pipe having both a hub H and a flange F, it is preferred to position the cutters 13 in the slots 32 such that alternate cutters extend inwardly and outwardly of the annular surfaces of the body 12 to cut cleanly through without binding and thereby fully remove a hub H and a flange F (if present) from the end portion of a pipe P. Leading and trailing refer to the orientation of the slot wall relative to the direction of rotation R of the plunge cutting device 10, i.e., the leading wall leads and the trailing wall follows.

In carrying out the invention, the slots 32 are located so that the cutters 13 mounted therein present forwardly facing cutting edges that are skewed relative to a radius for the purpose of causing the shavings generated at the front face during cutting to be ejected radially outwardly.

The trailing wall 36 of each slot 32 preferably lies along a radius of the cylindrical body 12, and each leading wall 34 lies in a secant or chord of the cylindrical body. The slots 32 are illustrated extending axially relative to the cylindrical body 12. However, without departing from this invention, it may be desired to tilt the slots 32 axially and thereby angle the openings along the inner and outer surfaces of the annular section of the body 12 but maintain the trailing edge along a radius on the front face. The cutters are secured in the slots 32 so that, preferably, in addition to the forwardly presented cutting edge an axially extending cutting edge is provided which projects either outwardly or inwardly of the annular section or a projection thereof. When square cutters 13 are used, as illustrated, the forwardly facing cutting edge cuts into the exposed edge or face of an exposed pipe member, such as a hub H or flange F, while the axially extending cutting edge of the cutter 13 cuts along the wall of the cut, when plastic material is present, and prevents cutter binding.

To secure the cutters 13 in the slots 32 each of the slots 32 is associated with counterbore 40 and a threaded set screw hole 42. Each set screw hole 42 extends through the annular section of the cylindrical body 12 to open onto its associated leading wall 34. The counterbores 40 provide a recess in the outer surface 20 of the cylindrical body for the set screws 44 so that they do not project and allow access to set screw holes 42, thus protecting screws 44 from damage during use. In this manner set screw holes 42 and associated set screws 44 are nested within the cylindrical body 12. Preferably, the set screws 44 are conventional allen-type screws which can be manipulated with an allen-type wrench.

The slots 32 are dimensioned to receive the cutters 13. The cutters 13 are preferably square cutting blades of hardened steel, silicon carbide, ceramic, or the like, available as off-the-shelf inserts, and have cutting edges on four sides. The cutters 13 preferably have bevels on one surface, and are positioned in the slots so that the bevels angle toward the trailing surface 36. The cutters 13 are preferably located so that the front edge of the cutter 13 projects from the front face of the cylindrical body 12. To this end, it is preferred that the cutting edge of each cutter 13 be slightly greater (approximately 1/16 inch) in length than the depth of each slot 32. When a so-dimensioned cutter 13 is placed in a slot 32 it will project a proper distance for cutting without requiring special adjustment by the user.

The cutters 13 are positionally adjustable and secured within the slots 32 by tightening the allen-type set screws 44 in threaded holes 42. Preferably, the counterbores 40 and the set screws holes 42 are positioned so that the set screws 44 frictionally engage and secure the cutters 13 on their leading surface. In other words, the screws 44 compress against the unbeveled surface of the cutters 13 which lie against the leading walls 34 of the slots 32 and hold the cutters 13 so that they bear against the trailing walls 36 while cutting. The cutters 13 are laterally positionable in the slots 32 meaning that the cutters may be positioned to also project either from the outer annular surface 20 (see FIGS. 3, 4) or the inner annular surface 18 of the cylindrical body 12 so as to present an axially extending cutting edge. As explained below, by loosening a set screw 44, a cutter 13 may be translated in a slot 32 for precise positioning and, therefore, pipe member plunge cutting.

Operation of the Plunge Cutter

For the purpose of this discussion, reference is made to FIGS. 1 and 3. FIGS. 1 and 3 depict pipe P having attached thereto a flange F (which may be wall mounted) which is joined at a hub H. The purpose of the plunge cutting operation is to plunge cut through the flange F and remove all of the hub H while removing a minimum amount of the pipe P (leaving the pipe P at substantially its original outer diameter). A pilot 16 of desired diameter and length is selected and attached to the back wall 19 to center the pilot 16 relative to the cylindrical body 12 and establish an open annulus 30 of appropriate dimensions to journal the pipe P during cutting operations.

The user positions and secures the cutters 13 in the slots 32 and attaches the device 10 via shaft 14 to a rotary device, e.g. a drill (not illustrated). The user then slides the pilot 16 into the opening of the pipe P and initiates rotation of the device 10. The plunge cutter 10 is pressed toward the pipe opening to initiate cutting of the flange F and/or hub H, by the cutters 13. As cutting progresses, the flange F and/or hub H are cut away and the pipe P is shaved where desired. In accordance with the invention, due to the orientation and location of the cutters 13 and their cutting edges, the cuttings/shavings/filings from the pipe coupling are caused to be ejected outwardly and radially from the cutters 13. By providing for expulsion of the cutting debris, forward progress during plunge cutting and the cutting edges of the cutters 13 are not impeded due to buildup of the cuttings/shavings/filings. To achieve the prevention of build-up, in keeping with the invention, the trailing edge of the cutters are located such as to lie along a radius from the center line of the cylindrical body 12, as seen by the location of the slots 32 pictured in FIG. 4. Accordingly, the leading edge of the cutter 13 will be skewed from a radius. Thus, during rotation, material on the front edge of the cutters 13 is urged outwardly toward and beyond the outer annular surface 20, due to the slicing action of the cutting edge. Accordingly, the cuttings/shavings spiral outwardly and away from the plunge cutter 10. By so clearing the cuttings, the torque requirements to cut pipe flange F or hub H, are reduced.

As cutting progresses, the pipe P translates into annulus 30 and cutting can continue, if desired, until the end of the pipe P reaches the inner back surface 19 of the annular section. A new coupling, extension or the like can then be mounted onto the conditioned end of the pipe P.

It is important to proper practice of this invention that the cutters 13 be properly positioned in the slots 32. When a plurality of cutters is present, the user may select certain cutters to protrude from the inner annular surface 18 and others from the outer annular surface 20. Any pipe joint adhesive and a minimum amount of the outer wall of pipe P can be removed, thus eliminating residual, old adhesive with a minimum reduction in the outer diameter of the pipe. The amount of material removed from the outer surface of the pipe P corresponds to the degree cutters 13 protrude from the inner annular surface 18 of cylindrical body 12. Furthermore, the outwardly protruding cutters 13 will bore through any projecting flange F to the extent selected by the user, and condition the end of the pipe P, the hub H, and any flange F (when present) to permit a new pipe or pipe coupling to be inserted around the old pipe P and secured with pipe adhesive.

The pilot 16 is of selected diameter and is easily substituted for a pilot of different diameters/dimensions by unscrewing the screws 28, substituting a different pilot, aligning the holes, and re-securing the new pilot with the screws. In this manner, it is relatively simple to adjust the width of the annulus 30 formed between the cylindrical body 12 and the pilot 16 in order to accommodate different pipe thicknesses and configurations. This convertibility feature reduces the number of pipe plunge cutters required to service a full range of pipe sizes.

Furthermore, the axial length of the pilot 16 is variable. If the plunge cutting device 10 is employed for cutting elbows and the like where the length of a straight portion behind an end or shoulder is short, a shorter pilot 16 can be selected to accommodate such shorter length and still permit plunge cutting.

The cutters 13, as noted above, preferably possess four different cutting surfaces. During use the cutting edges tend to dull. Thus in order to provide a new cutting edge, the user need only to loosen the set screw 44, slide the cutter 13 from its slot 32, rotate the cutter to provide an unused edge, reset the cutter 13 in the desired position in the corresponding slot 32, and tighten the set screw 44. When all four edges of a cutter 13 have been dulled, then it is replaced with a new cutter.

Industrial Applicability

The instant invention has utility for pipe plunge cutting operations, particularly for removal of plastic pipe hubs, elbows, flange or planar mounting members. This invention permits controlled plunge cutting through a plastic surface for removal thereof and removal of undesired pipe joint remnants to provide a clean length of exposed pipe for retrofit coupling. The invention is particularly useful for plumbers and maintenance contractors when repairing flush or wall mounted pipe fixtures requiring a clean pipe ending to a specific depth for adding a replacement coupling or flange.

Given the foregoing, variations and modifications to the invention should now be apparent to a person having ordinary skill in the art. These variations and modifications are intended to fall within the scope and spirit of the invention as defined by the following claims.

What is claimed is:

1. A device for plunge cutting plastic pipe members carried by a pipe end portion comprising:
   a cylindrical body having an annular section having a front face, said annular section being of selected length and thickness, said annular section defining an inner annular surface and an outer annular surface, said cylindrical body having at least one slot extending axially from said front face to a selected depth, each slot being defined by a leading wall and a trailing wall, said trailing wall lying in a radius of said cylindrical body;
   a cutter for said at least one slot;
   positioning means for securing each cutter in a respective slot, said positioning means permitting the cutter to project forwardly from the front face of said annular section;
   pilot means for guiding said cylindrical body relative to a pipe end portion, said pilot means being dimensioned to journal within the pipe end portion and being disposed co-axially of said annular section and secured to said cylindrical body; and
   drive coupling means for coupling said cylindrical body to a source of rotational energy to cause said cylindrical body to rotate about its axis relative to the exposed pipe portion.

2. A plunge cutting device according to claim 1 where said at least one slot intersects both the inner and outer annular surfaces to extend through said entire annular section.

3. A plunge cutting device according to claim 1 where the cutter has a defined length and width and the depth of said at least one slot is less than the defined cutter length.

4. A plunge cutting device according to claim 1 further comprising a plurality of slots equally spaced around said annular section.

5. A plunge cutting device according to claim 4 including a plurality of cutters corresponding to the plurality of slots.

6. A plunge cutting device according to claim 5 where said cutters are equidistantly spaced around said front face of said annular section and have trailing edges extending perpendicular to the axis of said cylindrical body.

7. A plunge cutting device according to claim 6 including three slots, the trailing walls of which are disposed substantially 120 degrees from each other.

8. A plunge cutting device according to claim 6 including four slots, the trailing walls of which are disposed substantially 90 degrees from each other.

9. A plunge cutting device according to claim 5 where said cutters are square and define cutting surfaces on all four sides.

10. A plunge cutting device according to claim 9 where the cutting surfaces are beveled and the leading edge of said bevel is adjacent the leading wall of said slots.

11. A plunge cutting device according to claim 10 where the cutting edges are slightly greater in length than the depth of said slots.

12. A plunge cutting device according to claim 11 where a select number of cutters are positioned to project radially outwardly of said outer annular surface.

13. A plunge cutting device according to claim 11 where a select number of cutters are positioned to project inwardly from said inner annular surface.

14. A plunge cutting device according to claim 1 where said annular section has a constant inner and outer diameter.

15. A plunge cutting device according to claim 1 where said pilot means is a substantially solid cylinder having an outer diameter less than an inner diameter of said annular section.

16. A plunge cutting device according to claim 15 where said pilot means is greater in length than said cylindrical body.

17. A plunge cutting device according to claim 1 where said drive coupling means is a shaft and said shaft is affixed to said pilot means.

18. A device for plunge cutting pipe, pipe couplings, and the like, including at least an exposed tubular pipe portion comprising:

a cylindrical body having an end wall and an annular section, said annular section being of selected length and thickness, said annular section being joined to said cylindrical body and defining an inner annular surface and an outer annular surface and a front surface, said cylindrical body having a plurality of slots, substantially equidistantly spaced about the front face of said annular section, each slot extending axially from said front surface to a selected depth and having a substantially constant selected width, each of said plurality of slots defining a leading wall and a trailing wall, said trailing wall lying in a radius of said cylindrical body;

a plurality of square cutters having beveled edges for each of said slots;

set screws for adjustably positioning each of said cutters with respect to said slots so that at least two beveled edges project from at least two of said surfaces of said annular section;

pilot means for guiding said cylindrical body relative to the exposed tubular pipe portion, said pilot means being dimensioned to journal within the exposed tubular pipe portion and being disposed co-axially and secured to said cylindrical body; and drive coupling means connected to said end wall for coupling said cylindrical body to a source of rotational energy to cause said cylindrical body to rotate about its axis relative to the exposed tubular pipe portion and thereby cause said cutters to plunge cut into the exposed tubular pipe portion.

19. A method for plunge cutting a pipe member with a tool including a cylindrical body defining an annular section with slots a pilot, and cutters secured within the slots, comprising the steps of:

a) positioning at least one of the cutters so that it projects radially inwardly from said annular section;

b) positioning at least one of the cutters so that it projects radially outwardly from said annular section;

c) positioning at least one of the cutters so that it projects forward of a front face of said annular section;

d) inserting the pilot into the pipe member to guide the cylindrical body;

e) rotating the cylindrical body, f) moving the cylindrical body axially to bring the cutters into contact with an exposed portion of the pipe member while continuing to rotate the cylindrical body thereby to cause the cutters to plunge cut into the pipe member; and g) maintaining the cutters in cutting contact with the pipe member until the pipe member is cut to a desired axial extent.

20. A plunge cutting device comprising:

a body having an axis, a cylindrical inner periphery, a cylindrical outer periphery coaxial with the inner periphery, and a front portion extending between the inner and outer peripheries;

at least two cutters mounted on the body, each cutter having a cutting edge projecting from the front portion of the body, the cutting edges collectively extending across the front portion from the outer periphery to the inner periphery of the body;

a pilot coaxially secured to the body inside the inner periphery of the body and having a cylindrical outer surface for guiding the body with respect to a tubular member, the pilot having a maximum diameter smaller than a diameter of the inner periphery of the body; and drive coupling means for coupling the body to a source of rotational energy for rotating the body about its axis.

21. The plunge cutting device according to claim 20 wherein each cutting edge has a leading edge extending non-radially with respect to the axis of the body.

22. The plunge cutting device according to claim 20 wherein at least one cutting edge extends radially outwardly from the outer periphery of the body.

23. The plunge cutting device according to claim 20 wherein at least one cutting edge extends radially inwardly from the inner periphery of the body.

24. The plunge cutting device according to claim 20 wherein the body has at least two slots in its front portion, and each cutter is disposed in one of the slots.

25. A plunge cutting device according to claim 20 wherein the at least two cutters include a first cutter having a cutting edge extending to the inner periphery of the body and a second cutter having a cutting edge extending to the outer periphery of the body and overlapping the cutting edge of the first cutter in the radial direction of the body.

26. A plunge cutting method for removing a fitting from an exterior of a pipe comprising:

mounting at least two cutters on a body having cylindrical inner and outer peripheries with cutting edges of the cutters projecting from a front surface of the body and with the cutting edges collectively extending between the inner and outer peripheries of the body;

inserting a cylindrical pilot coaxially secured to the body into a pipe with an exterior surface of the pilot and the inner periphery of the body separated by at least the wall thickness of the pipe, the pilot having a maximum diameter smaller than a diameter of the inner periphery of the body; and rotating the body about its axis while contacting the cutters with the fitting to cut axially into the fitting across the entire front surface of the body.

27. The method according to claim 26 including inserting the pipe into a space between the pilot and the inner periphery of the body as the cutters cut into the fitting.

28. The method according to claim 26 including disposing each cutter so that a leading edge of its cutting edge extends non-radially with respect to the body.

* * * * *